(12) United States Patent
Hays

(10) Patent No.: US 8,009,723 B2
(45) Date of Patent: Aug. 30, 2011

(54) MEASUREMENT OF BASEBAND TIMING IN A SPREAD SPECTRUM COMMUNICATIONS SYSTEM

(75) Inventor: Nathan Hays, San Francisco, CA (US)

(73) Assignee: Terrace Communications Corporation, San Francisco, CA (US)

( * ) Notice: Subject to any disclaimer, the term of this patent is extended or adjusted under 35 U.S.C. 154(b) by 994 days.

(21) Appl. No.: 11/803,823

(22) Filed: May 16, 2007

(65) Prior Publication Data

US 2007/0280337 A1 Dec. 6, 2007

Related U.S. Application Data

(60) Provisional application No. 60/810,251, filed on Jun. 2, 2006.

(51) Int. Cl.
*H04B 1/69* (2006.01)
*H04L 7/06* (2006.01)

(52) U.S. Cl. ......... 375/149; 375/355; 375/358

(58) Field of Classification Search .......... 375/130, 375/316, 355, 358, 140, 145, 147, 149; 455/426.1
See application file for complete search history.

(56) References Cited

U.S. PATENT DOCUMENTS

| | | | |
|---|---|---|---|
| 5,703,913 A | 12/1997 | Yamamoto et al. | |
| 6,650,718 B1 * | 11/2003 | Fujimura et al. | 375/355 |
| 7,079,523 B2 * | 7/2006 | Nelson et al. | 370/342 |
| 7,092,467 B2 | 8/2006 | Lee et al. | |
| 2002/0150181 A1 | 10/2002 | Sayeed | |
| 2003/0186666 A1 | 10/2003 | Sindhushayana | |
| 2005/0253742 A1 | 11/2005 | Soga | |

* cited by examiner

*Primary Examiner* — Tesfaldet Bocure
(74) *Attorney, Agent, or Firm* — Trellis IP Law Group, PC

(57) ABSTRACT

Systems, apparatuses, and methods for providing timing estimates of received signals are disclosed. In one embodiment, sub-chip timing in spread spectrum signals can be achieved without requiring oversampling in the receiver. A transmitter can adjust the timing of certain transmitted symbols by a fraction of a chip time from an expected time, and send the mistimed symbols to a receiver. The output of the receiver's de-spreading correlator can show different magnitudes for wedge symbols with different timing errors. By setting some symbols early and some late, and by taking the difference between their magnitudes, a transfer function between the result and a timing error can be determined.

20 Claims, 7 Drawing Sheets

US 8,009,723 B2

MEASUREMENT OF BASEBAND TIMING IN A SPREAD SPECTRUM COMMUNICATIONS SYSTEM

REFERENCE TO RELATED APPLICATIONS

This application claims priority from Provisional U.S. Patent Application 60/810,251 "Measurement of Baseband Timing in a Spread Spectrum Communications System", filed Jun. 2, 2006, by Nathan Hays. This application is incorporated herein by reference for all purposes.

BACKGROUND OF THE INVENTION

This invention is related in general to electronic communication, and more specifically, to timing measurement in a spread spectrum communications system.

Today's wireless communications systems are used to transfer digital information. In the case of radio-frequency (RF) spread spectrum satellite communications systems, it is critical to maintain accurate timing synchronization among multiple transmitters and receivers. For example, in a voice over Internet protocol (VoIP) system, it is necessary to maintain accurate clocking of data among separate users, or endpoints, since each endpoint is allocated a precise portion of the satellite transmission resources. Such resources can include time slots, bandwidth, power allocation, etc. Typically, the allocation of these resources may be determined by a clock or timing signal relative to a baseband frequency or carrier that is used to transmit signals to and from an orbiting satellite.

Due to the high speed of satellite data transfers, relatively long distances involved, delays or latency of data path processing, susceptibility of a radio signal to weather, directional transmission, and other factors, it is difficult to maintain synchronized timing signals among multiple endpoints.

SUMMARY OF EMBODIMENTS OF THE INVENTION

Particular embodiments can provide timing estimates of received signals. One embodiment can achieve "sub-chip" timing in spread spectrum signals without requiring oversampling in the receiver. A transmitter can adjust the timing of certain transmitted "symbols" by a fraction of a chip time from an expected time, and send the mistimed symbols to a receiver. The output of the receiver's de-spreading correlator then shows different magnitudes for "wedge" symbols with different timing errors.

By setting some symbols early and some late, and by taking the difference between their magnitudes, a transfer function between the result and a timing error can be determined. This estimate can be made arbitrarily fine by increasing the resolution of the samples, and by increasing the number of wedge symbols so as to improve the signal-to-noise ratio (SNR). The calculated timing error can be used in a compensation loop to allow the transmitter to adjust its timing. The mistimed symbols can be included in specialized packets, used in multicode spread spectrum schemes, or used to other advantages.

DETAILED DESCRIPTION OF EMBODIMENTS OF THE INVENTION

Overview

In one embodiment, a method for determining a timing error in a received signal can include: (i) receiving first and second symbols transmitted off-peak in association with a signal received from a transmitter; (ii) detecting the first and second symbols by sampling the symbols at a chip rate; and (iii) comparing the relative magnitudes of the symbols to achieve a timing error result.

In one embodiment, an apparatus for determining a timing error in a received signal can include: (i) a radio-frequency (RF) receiving circuit for receiving first and second symbols transmitted off-peak in association with a signal received from a transmitter; (ii) a detector for detecting the first and second symbols by sampling the symbols at a chip rate; and (iii) a comparator for comparing the relative magnitudes of the symbols to achieve a timing error result.

In one embodiment, a method for transmitting an RF signal including timing information can include: (i) transmitting a baseband signal; (ii) transmitting a first wedge symbol in association with the baseband signal, where the first wedge symbol is transmitted at a time offset from a predetermined sample time by a fraction of a multiple of a chip rate; and (iii) transmitting a second wedge symbol in association with the baseband signal, where the second wedge symbol is transmitted subsequent to the transmission of the first wedge symbol, and where the second wedge symbol is transmitted at a time offset from a predetermined sample time by a fraction of the multiple of the chip rate.

Example Embodiments

Figure 1:
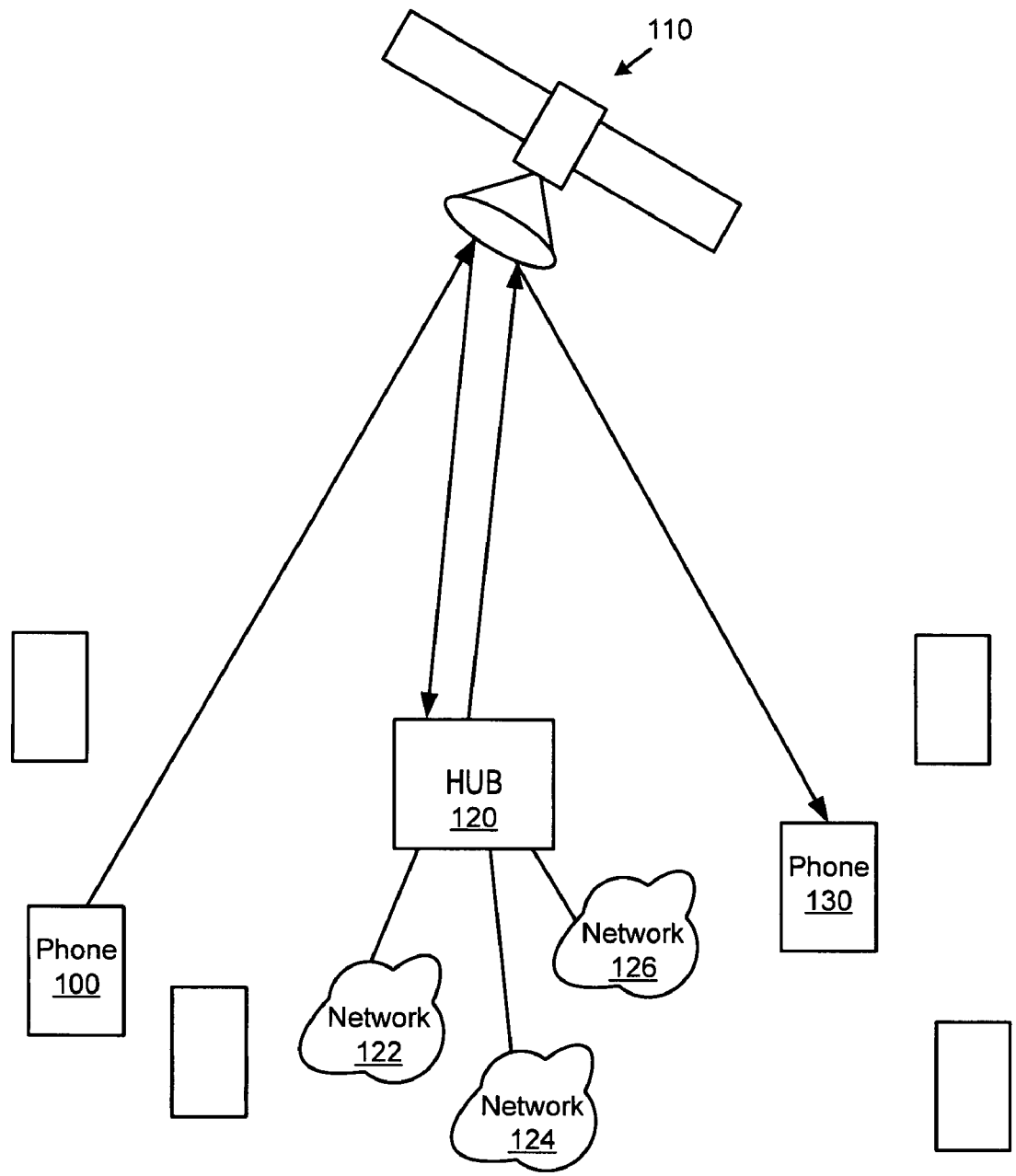
FIG. 1 illustrates a block diagram showing example components in a digital satellite voice communications system.

FIG. 1 illustrates basic components in a digital satellite voice communications system. In FIG. 1, data modem or phone 100 (e.g., a transmitter) may be used to originate a voice transmission intended for phone 130 (e.g., a receiver). For example, the transmission from phone 100 can be transferred through a cell phone network (not shown). Other networks and devices, such as the Internet, a local area network (LAN), switches, routers, etc., can be employed, but are not shown for ease of illustration. In general, the intermediary communication channels and devices are not included in the discussion herein. Any number and type of transmitters and/ or receivers may be used, such as a pager, data modem or device that carries digitized voice, personal digital assistant (PDA), portable e-mail device (e.g., Blackberry™, etc.), laptop or other computing device, landline (e.g., plain old telephone service or POTS) telephone, etc. Further, any suitable types of transmission systems, protocols, data formats, etc., can be utilized in particular embodiments.

A transmission from phone 100 can be converted to an RF signal, such as a spread spectrum signal, and sent to satellite

110. Satellite 110, in turn, can send the signal to a hub (e.g., 120) for timing synchronization, signal coordination, routing and/or other processing. Hub 120 shown in FIG. 1 may be coupled to other communication infrastructure and/or resources, such as Internet 122, cellular phone network 124, standard phone network 126, etc. Also, timing features in particular embodiments can be applied to any one leg or hop of a signal transmission. Further, such a transmission need not be round-trip, or need not reach its ultimate intended receiver.

Hub 120 can include processing resources, such as a central processing unit (CPU) coupled to random-access memory (RAM), and/or other typical digital computing resources. In particular embodiments, as much of the functionality as possible, as described herein, is performed by hub 120. However, in some embodiments all or a portion of the functionality may be performed by other devices, such as phones 100 and/or 130, satellite 110, intermediary devices (not shown), or other components or devices, as desired. Further, processing can be performed in real time or near real time. In addition, functions can be performed in a distributed processing manner (e.g., parallel processing by multiple devices), in a batch mode, or by any other suitable means.

A signal sent to hub 120 may be processed and sent back to satellite 110 for transfer to phone 130, which can be the ultimate intended receiver of the signal in this particular example. However, the second leg of the transmission need not be by satellite. In other words, the transmission from hub 120 to satellite 110 and to phone 130 may be by a terrestrial network, such as the Internet, a cellular phone network, a standard telephone network, terrestrial radio network, fiber optic, etc. Timing detection and control functions can be performed at any suitable point in a system, and for any one or more signals in a transmission. For example, a transceiver can receive and measure its previously transmitted signal, or a signal derived therefrom. Further, although features are described herein as primarily directed to a satellite communications system, other types of communications systems can be adaptable for use in particular embodiments.

One of the functions performed by hub 120 may be to detect timing errors in a signal sent from transmitters, such as phone 100. In particular embodiments, timing errors can be detected by the transmitter, including at least two mistimed symbols in a given transmission. The mistimed symbols may be offset from a nominal timing so that when the magnitudes of the symbols are detected at hub 120, the difference in magnitudes serves to indicate the timing error.

Figure 5:
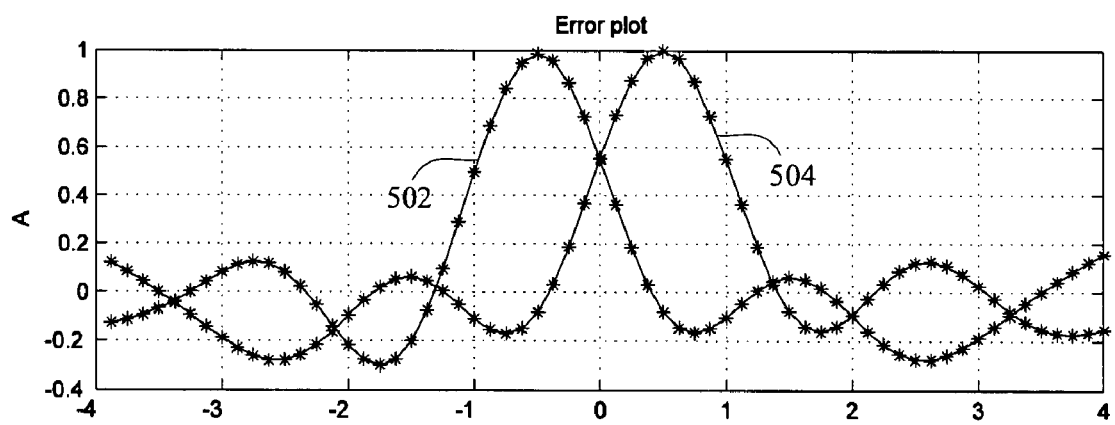
FIG. 5 illustrates example waveforms for input and output of an error estimator for various timing offsets.
Figure 5:
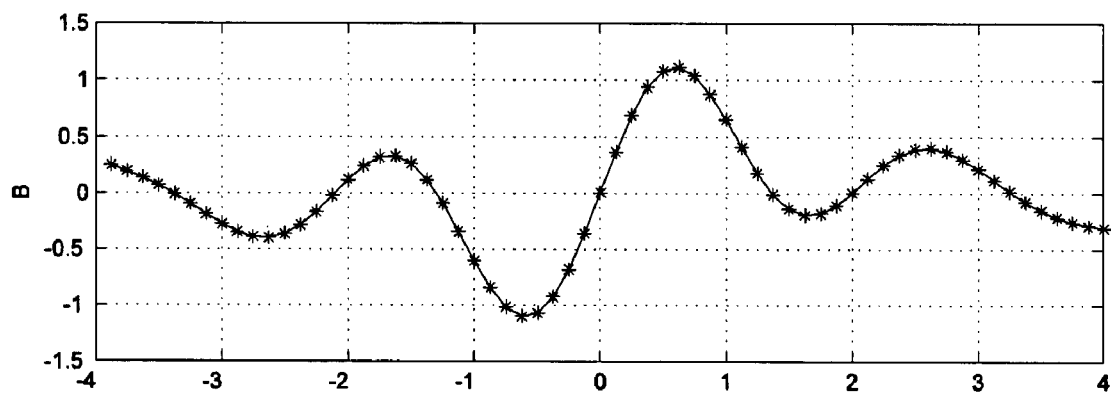

In particular embodiments, "wedge" symbols may be offset from a predicted sampling time known as the "chip rate" that can be synchronized between the hub, transmitter, and receiver. The offset, or "off-peak," can be designed so that a predicted sampling of the wedge symbols at approximately the chip rate can result in a sampling at a greatest slope of the difference plot of the magnitudes, as shown in FIG. 5 and discussed in more detail below. This may have the effect that a timing error that causes "mis-sampling" produces the largest magnitude difference as long as the timing error is relatively small with respect to the chip rate. In other systems, wedge symbols can be sent at times other than those described herein in order to handle different types of timing errors. For example, wedge symbols may be placed at large offsets on the order of at least one chip time in order to measure large timing errors. For example, this approach may be used to initially acquire timing lock by an unsynchronized receiver. Further, a combination of large offset and small offset wedge symbols may be used in a comprehensive synchronization acquisition and maintenance system in particular embodiments.

In general, any number and/or type of wedge symbols may be used, depending upon a specific application. Further, the value of wedge symbols can be used to convey data such that the wedge symbols need not be purely overhead in the signal transmissions. Wedge symbol values can also be used for other purposes, such as to convey an increasing sequence number for diagnostic purposes, etc.

As described above, particular embodiments can provide timing estimates of received spread spectrum signals, and may achieve sub-chip timing without requiring oversampling in the receiver. A transmitter can adjust the timing of certain transmitted symbols by a fraction of a chip time from an expected time using mistimed or wedge symbols. In addition, an output of the receiver's de-spreading correlator can show different magnitudes for wedge symbols with different timing errors. Further, by setting some symbols early and some late, and by taking the difference between their magnitudes, a transfer function between the result and the true timing error can be made. This estimate can be made arbitrarily fine by increasing the resolution of the samples and by increasing the number of wedge symbols so as to improve the signal-to-noise ratio (SNR).

The timing estimates so determined can be used to synchronize the baseband timing of different transmitters. The error estimate of a transmitter can be provided to a closed loop feedback controller, which can signal the transmitter to adjust its timing so as to eliminate the error. For example, this may be useful in minimizing cross-correlation interference. Further, some types of spread spectrum methods, such as orthogonal variable spreading factor (OVSF), and slotted spread aloha, typically may require this level of synchronization.

In particular embodiments, a transmitter can generally operate at a multiple of the chip frequency (e.g., 4 to 8 times) in oversampled periods or "chiplets." The chip rate in turn is a multiple of the symbol rate according to the length of the spreading code. In particular embodiments, the transmitter may first perform an "up-sample" of the symbols to the chip rate. The spreading sequence can then be applied to produce a stream of chips. These chips are in turn up-sampled to the chiplet rate. The chiplet stream can then be passed through a pulse shaper, usually a "sinc" function, to minimize consumed bandwidth. The shaped signal may then be sent to a digital-to-analog converter (DAC), or group of DACs, for modulation of a carrier.

To send the wedge symbols, the transmitter can insert a wedge symbol a fraction of a chip time off of a nominal time. This may be done at any time in the transmission process, but is easiest to accomplish when the digital spread stream is up-sampled prior to pulse shaping.

Figure 2:
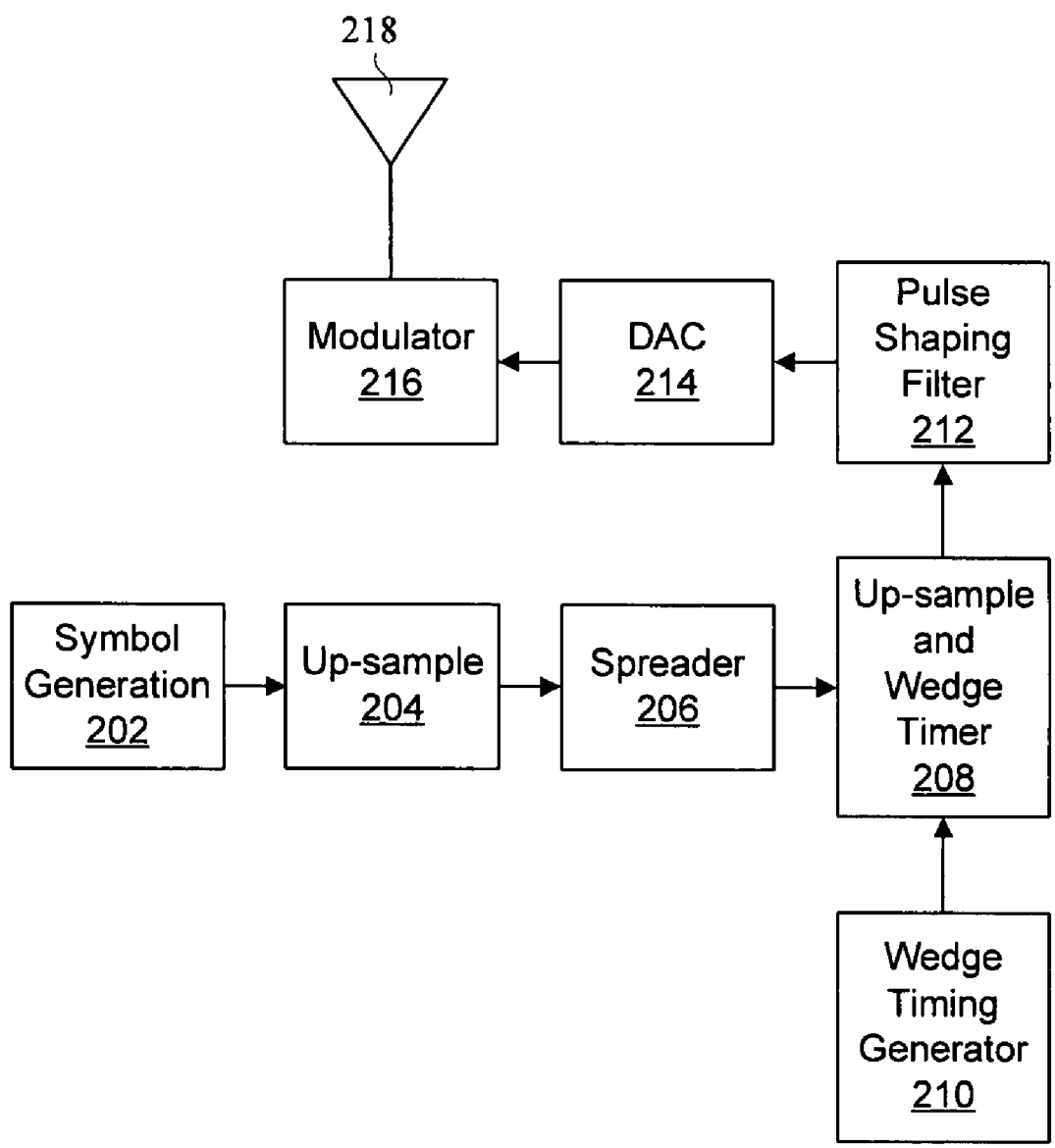
FIG. 2 illustrates components of an example transmitter that uses wedge symbols for timing estimates.

Referring now to FIG. 2, components of an example transmitter that uses wedge symbols for timing estimates are shown and indicated by the general reference character 200. Symbol generation block 202 can produce a symbol stream, which can include the wedge symbols. Up-sample block 204 can increase a rate of the symbol stream to the chip rate. Spreader block 206 can spread the symbols using the spreading code. Up-sample and wedge timer block 208 can up-sample the chips to the chiplet rate. At substantially the same time, up-sample and wedge timer block 208 can adjust the starting chiplet of the mistimed wedges according to signals from wedge timing generator 210. Wedge timing generator 210 can also generate a signal for up-sample and wedge timer block 208 to adjust the timing of the wedge symbols according to a predefined packet format. Pulse shaping filter block 212 can limit the spectrum of the spread signal. DAC 214 can convert the digital stream to an analog baseband signal for modulator 216. Modulator 216 can modulate a carrier by the analog signal produced by DAC 214, and supply to antenna 218 for transmission.

Figure 3:
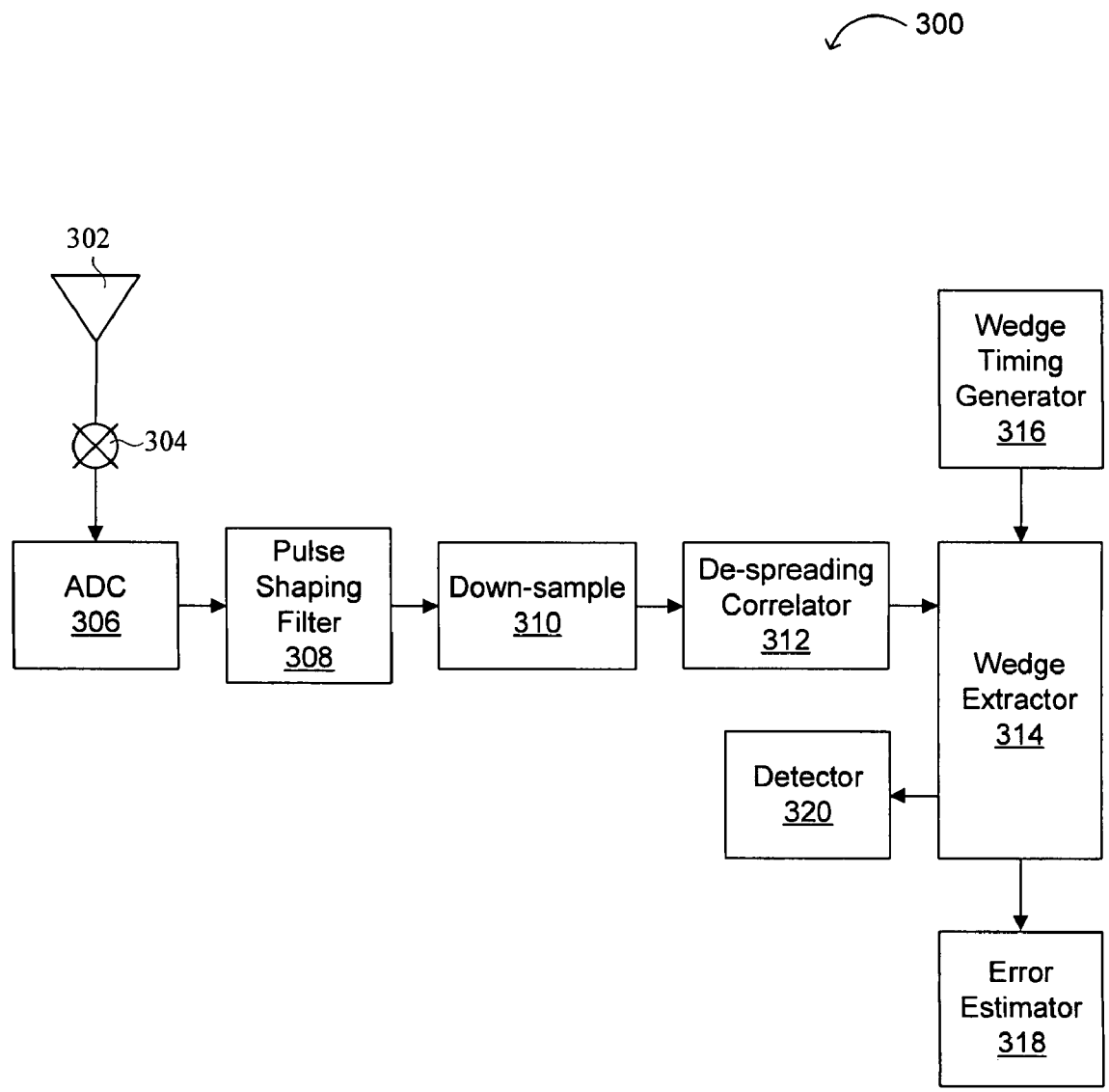
FIG. 3 illustrates components of an example receiver that uses wedge symbols for timing estimates.

Referring now to FIG. 3, components of an example receiver that uses wedge symbols for timing estimates are shown and indicated by the general reference character 300. Antenna 302 can receive a signal and provide to demodulator block 304, which can demodulate the carrier to produce a baseband signal. Analog-to-digital converter (ADC) 306 can convert the baseband signal to a digital stream. Pulse shaping filter block 308 can match the transmitter's pulse shaping filter for noise elimination. Down-sample block 310 can decimate the received signal to the chip rate. The timing of the decimation may be such that the samples occur nominally during the peak of the received symbol stream. De-spreading correlator block 312 can despread the decimated chip stream. Wedge extractor block 314 can measure the magnitude of the wedge symbols according to the wedge timing generator 316. The symbol stream may be passed on to detector 320. The wedge symbol measurements may be passed on to error estimator 318. Wedge timing generator block 316 can generate signals for wedge extractor 314 according to a predefined packet format. Error estimator block 318 can utilize the wedge symbol magnitude measurements from wedge extractor 314 to calculate the error estimate. Detector block 320 can perform the symbol to data detection.

Figure 4:
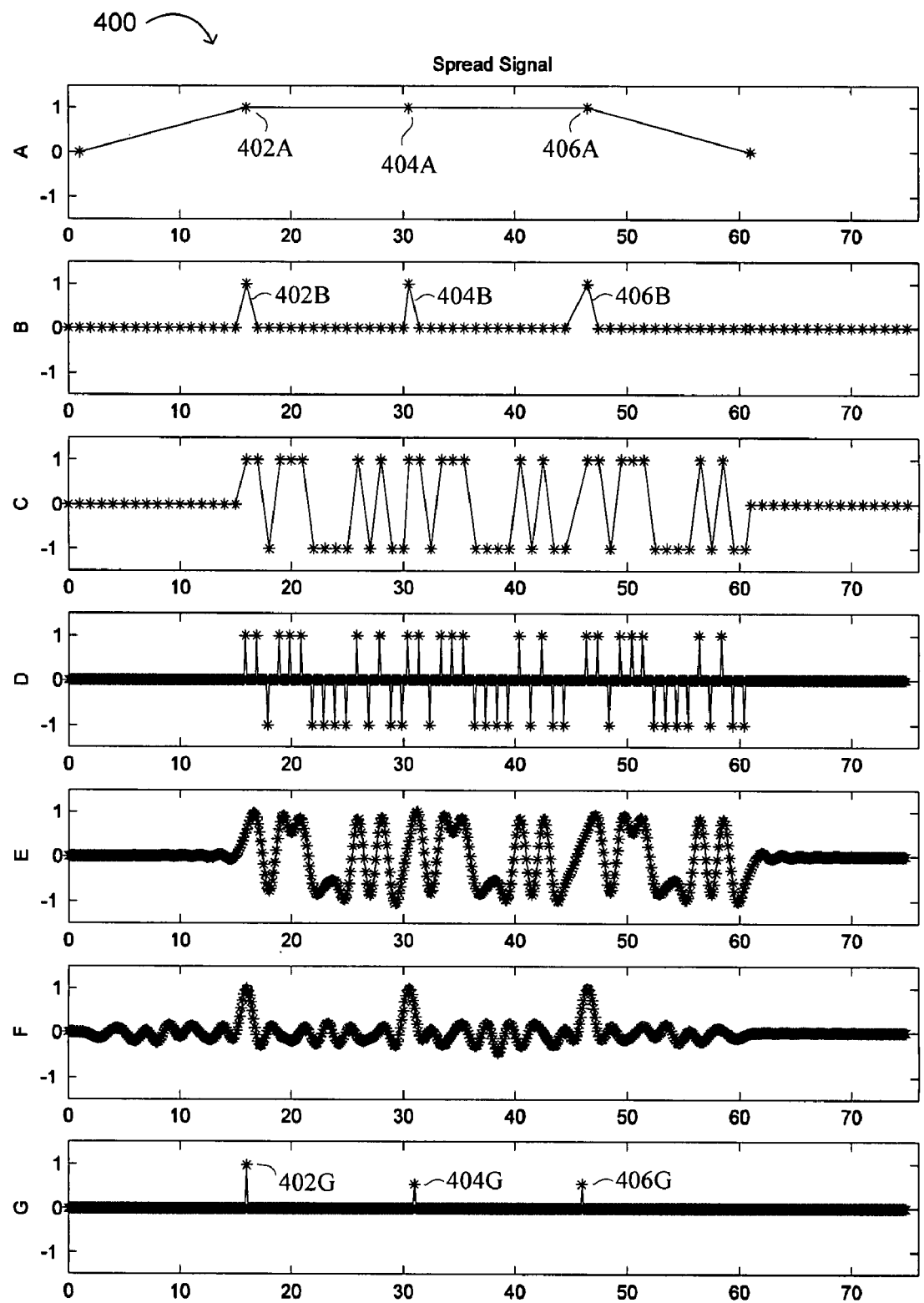
FIG. 4 illustrates example waveforms for signals at various stages of transmission and reception.

Referring now to FIG. 4, example waveforms for signals at various stages of transmission and reception are shown and indicated by the general reference character 400. In this example, the code (e.g., "Pn code") length is fifteen chips long and the chips are oversampled by eight prior to shaping by a digital "sinc" filter. Further, any suitable modulation scheme can be utilized with this example, but the magnitudes of the wedge symbols should be equal.

In this particular example, there are three symbols. The first may have nominal timing, the second is the first wedge symbol which comes four chiplets early, and the third is the second wedge symbol which comes four chiplets late. Also, this example shows the wedge symbols mistimed at the beginning of the process to aid in exposition. In practice, it may be more practical to mistime the wedge symbols while they are up-sampled just prior to pulse shaping.

In the example waveforms shown in FIG. 4, waveform A can be for three symbols (e.g., 402A, 404A, and 406A) with constant magnitude. Waveform B can be for symbols that have been up-sampled to the chip rate. Waveform B shows mistiming of the wedge symbols (e.g., 404B and 406B) with proper timing on symbol 402B. Waveform C shows the symbols having been spread by the Pn code 110111000010100b. Waveform D shows the chip stream having been up-sampled by eight to the chiplet rate. Waveform E shows the chiplet stream having been passed through the pulse shaping filter. This signal may be sent to the DACs to modulate a carrier. The receiver can demodulate the carrier and sample it with an ADC. The sampled signal may then be passed through a matching pulse shaping filter to reproduce the transmitted signal shown in waveform E. Waveform F can show the received signal passed through a matching correlator to despread the signal. In this plot, the correlation process occurs at the chiplet rate to show the full signal. In practice, the correlation process may occur at the chip rate. Waveform G shows the symbol stream reproduced by decimating the signal in waveform F. The timing of the decimated samples may be at the nominal point corresponding to the transmitted symbols. As can be seen in waveform G, the first symbol is reproduced with full magnitude (e.g., 402G). The two wedge symbols (e.g., 404G and 406G), since they were sampled at the nominal time and not at their peaks, have only half amplitude.

Referring now to FIG. 5, example waveforms for input and output of an error estimator for various timing offsets are shown and indicated by the general reference character 500. The magnitudes of wedge symbols 502 and 504 are plotted against timing error (in timing error units of chip times). Plot A shows errors in synchronization between the transmitter and the receiver affecting the magnitudes of the wedge symbols.

The difference of the wedge symbol amplitudes is plotted against the same timing errors (see waveform B). As shown, when there is perfect synchronization, the magnitudes of wedge symbols 502 and 504 are equal and the difference is zero. As the synchronization error increases, the difference measurement indicates the timing error according to the slope of the plotted curve.

Table 1 below shows one particular example Matlab® code listing used to produce results as shown in FIGS. 4 and 5.

TABLE 1

```
%--------------------------------------
% Create symbols and spreading sequence
%--------------------------------------
no = 8;    % number of chiplets
epsilon = 1/2;
sym = [0 1 1 1 0];
pn = 1-2*[0 0 1 0 0 0 1 1 1 1 0 1 0 1 1];
ns = size(sym);   ns = ns(2);
no = size(pn);    nc = nc(2);
np = nc*ns;
nw = np*no;
[xh]=hrollfcoef(21,no,1,0.27, 0);
xl = size(xh);
xl = xl(2);
nomtime = [0 nc*1 nc*2 nc*3 nc*4] + 1;
time = nomtime + [0 0 -epsilon +epsilon 0];
wedgendx1 = nomtime(3)*no+1;
wedgendx2 = nomtime(4)*no+1;
s = zeros(ns,2);    % Symbols
o = zeros(np,2);    % Oversampled symbols
c = zeros(np,2);    % Chip spread symbols
w = zeros(nw,2);    % Oversampled chips
z = zeros(nw,2);    % Shaped oversampled chips
d = zeros(nw,2);
w(:,1) = linspace(0,np-1/no,nw)';
w(:,2) = zeros(nw,1);
for symbol=1:ns        % For every symbol...
  s(symbol,1) = time(symbol);
  s(symbol,2) = sym(symbol);
  for oversym=1:nc   % For every symbol oversample
    on = symbol*nc+oversym;
    o(on,1) = time(symbol)+oversym-1;
    if (oversym == 1)
      o(on,2) = sym(symbol);
    else
      o(on,2) = 0;
    end
    c(on,1) = o(on,1);
    c(on,2) = sym(symbol) * pn(oversym);
    w(c(on,1)*no,2) = c(on,2);
  end
end
z(:,1) = w(:,1);
filtered = conv(xh,w(:,2));
z(:,2) = filtered(xl/2:xl/2+nw-1)/max(filtered);
f=zeros(nc,no);f(:,1)=fliplr(pn)';f=reshape(f',nc*no,1);rc=conv(f,z(:,2));
rl=size(f);
rl=rl(1);
r = z;
offset=rl/2+48+5;
r(:,2) = rc(offset:offset+nw-1)/max(rc);
d(:,1)=r(:,1);
d(nomtime*no+1,2)=r(nomtime*no+1,2);
span = 8;
```

TABLE 1-continued

```
for n=1:no*span
   errndx = n-no*span/2;
   err(n,1) = errndx/no;
   err(n,2) = r(wedgendx1+errndx,2);
   err(n,3) = r(wedgendx2+errndx,2);
   err(n,4) = err(n,3)-err(n,2);
end
figure;
subplot (7,1,1); plot (s(:,1),s(:,2),'*-'); axis ([0 np+1 -1.5 1.5]);
ylabel('A');
title ('Spread Signal');
subplot (7,1,2); plot (o(:,1),o(:,2),'*-'); axis ([0 np+1 -1.5 1.5]);
ylabel('B');
subplot (7,1,3); plot (c(:,1),c(:,2),'*-'); axis ([0 np+1 -1.5 1.5]);
ylabel('C');
subplot (7,1,4); plot (w(:,1),w(:,2),'*-'); axis ([0 np+1 -1.5 1.5]);
ylabel('D');
subplot (7,1,5); plot (z(:,1),z(:,2),'*-'); axis ([0 np+1 -1.5 1.5]);
ylabel('E');
subplot (7,1,6); plot (r(:,1),r(:,2),'*-'); axis ([0 np+1 -1.5 1.5]);
ylabel('F');
subplot (7,1,7); plot (d(:,1),d(:,2),'*-'); axis ([0 np+1 -1.5 1.5]);
ylabel('G');
figure;
subplot (2,1,1); plot (err(:,1),err(:,2:3),'*-'); ylabel('A'); grid on;
title('Error plot');
subplot (2,1,2); plot (err(:,1),err(:,4),'*-'); ylabel('B'); grid on;
```

Table 2 below shows one particular example Matlab® code listing used to produce the pulse shaping filter.

TABLE 2

```
% Generate coefficients of Nyquist filter
%
function [xh] = hrollfcoef(irfn,ipoint,sr,alfs,ncc)
%***************** variables ************************
% irfn       : Number of symbols to use filtering
% ipoint     : Number of samples in one symbol
% sr         : symbol rate
% alfs       : rolloff coeficiense
% ncc        : 1 -- transmitting filter 0 -- receiving filter
%*******************************************************
xi=zeros(1,irfn*ipoint+1);
xq=zeros(1,irfn*ipoint+1);
point = ipoint;
tr = sr ;
tstp = 1.0 ./ tr ./ ipoint;
n = ipoint .* irfn;
mid = ( n ./ 2 ) + 1;
sub1 = 4.0 .* alfs .* tr;        % 4*alpha*R_s
for i = 1 : n
   icon = i - mid;
   ym = icon;
   if icon == 0.0
      xt = (1.0-alfs+4.0.*alfs./pi).* tr; % h(0)
   else
      sub2 =16.0.*alfs.*alfs.*ym.*ym./ipoint./ipoint;
      if sub2 ~= 1.0
         x1=sin(pi*(1.0-alfs)/ipoint*ym)./pi./(1.0-sub2)./ym./tstp;
         x2=cos(pi*(1.0+alfs)/ipoint*ym)./pi.*sub1./(1.0-sub2);
         xt = x1 + x2; % h(t) plot((1:length(xh)),xh)
      else % (4alphaRst)'= 1plot((1:length(xh)),xh)
         xt = alfs.*tr.*((1.0-
2.0/pi).*cos(pi/4.0/alfs)+(1.0+2.0./pi).*sin(pi/4.0/alfs))./sqrt(2.0);
      end % if sub2 ~= 1.0
   end % if icon == 0.0
   if ncc == 0                   % in the case of receiver
      xh( i ) = xt ./ ipoint ./ tr;  % normalization
   elseif ncc == 1 % in the case of transmitter
      xh( i ) = xt ./ tr;        % normalization
   else
      error('ncc error');
   end      % if ncc == 0
end   % for i = 1 : n
```

In particular embodiments, a calculated timing error can be fed to a compensation loop to cause the transmitter to adjust its timing to the nominal chip synchronization of the system. Also in particular embodiments, a greater number of wedge symbols at different timing offsets may be sent to increase the effective range of the error measurement. For example, this can be used to aid in initial timing acquisition.

In particular embodiments, multiple wedge symbols with the same timing offset can be used to improve the SNR of the measurement. Also in particular embodiments, wedge symbols may be designed into a transmission packet to provide timing measurements on every transmission. Also in particular embodiments, the presence or detection of wedge symbols can be used to indicate that a particular transmitter (e.g., a transmitter that is assigned to generate the wedge symbols) is active and functioning properly. Should the wedge symbols disappear or otherwise be improperly generated, the detection of this condition can be used as a signal that the particular transmitter is not functioning properly. One action could be to designate another transmitter to generate the wedge symbols and to act in the role of the particular transmitter (e.g., as a master or controlling transmitter). In this respect, the wedge symbols can act in a similar manner to other signals that are periodically sent as "heartbeats" or "keepalives" and can act as a substitute or enhancement to such signals.

In particular embodiments, coordination between transmitters may be used to prevent wedge symbols from one transmitter from interfering with those of another. Also in particular embodiments, wedge symbols may be used in multi-code spread spectrum schemes, such as code division multiple access (CDMA), OVSF, and others. Also in particular embodiments, wedge symbols may be used in single or multi-code spread spectrum schemes, such as spread aloha multiple access (SAMA), and M-SAMA.

In particular embodiments, wedge symbols may be transmitted by a timing reference master to aid in timing acquisition by multiple remote transceivers. Also in particular embodiments, wedge symbols may be sent using a unique code that is orthogonal to the codes used in the rest of the system. Also in particular embodiments, wedge symbols may be used to calculate precise ranging measurements, such as in sound navigation and ranging (SONAR), radio detection and ranging (RADAR), and/or satellite tracking applications. For example, a RADAR receiver can remain tightly locked to a reflected signal using the wedge symbols for sub-chiplet timing resolution.

Figure 6:
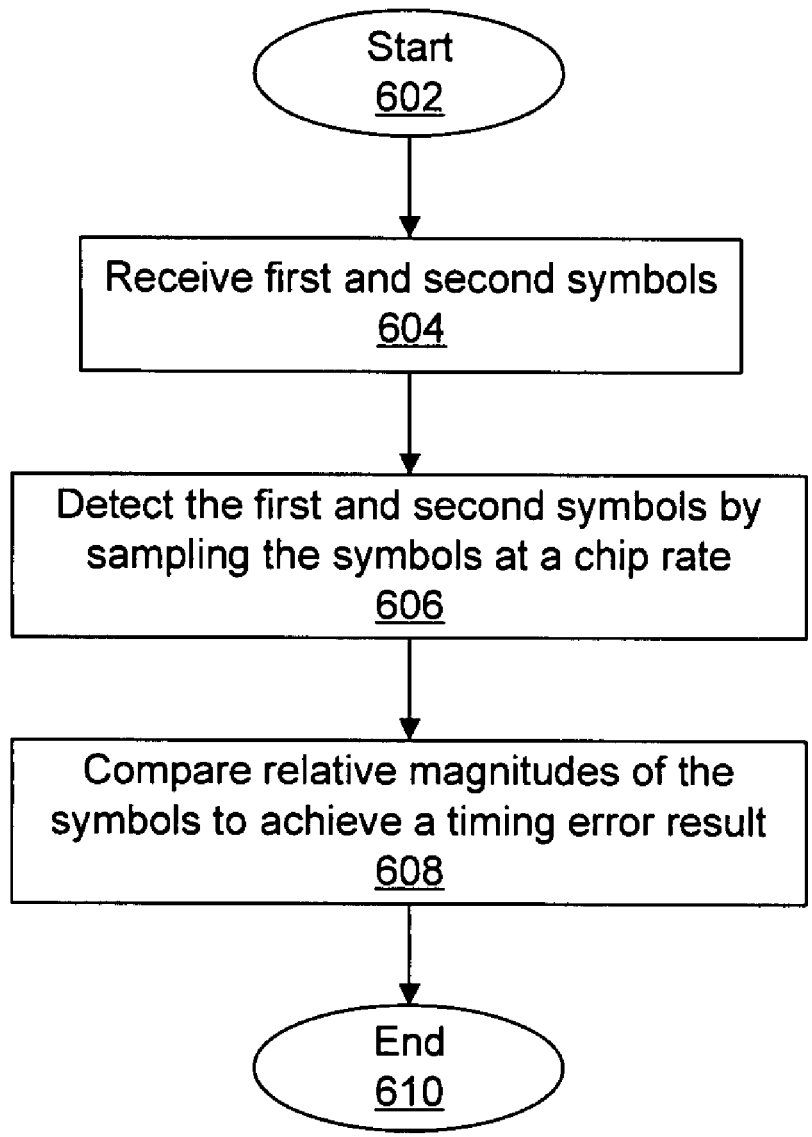
FIG. 6 illustrates a flow diagram for an example method of determining a timing error in a received signal.

Referring now to FIG. 6, a flow diagram for an example method of determining a timing error in a received signal is shown and indicated by the general reference character 600. The flow can begin (602), and first and second symbols can be received (604). For example, these symbols may have been transmitted off-peak in association with a signal received from a transmitter. Next, the first and second symbols can be detected by sampling the symbols at a chip rate (606). Then, the relative magnitudes of the symbols can be compared to achieve a timing error result (608), and the flow can complete (610).

Figure 7:
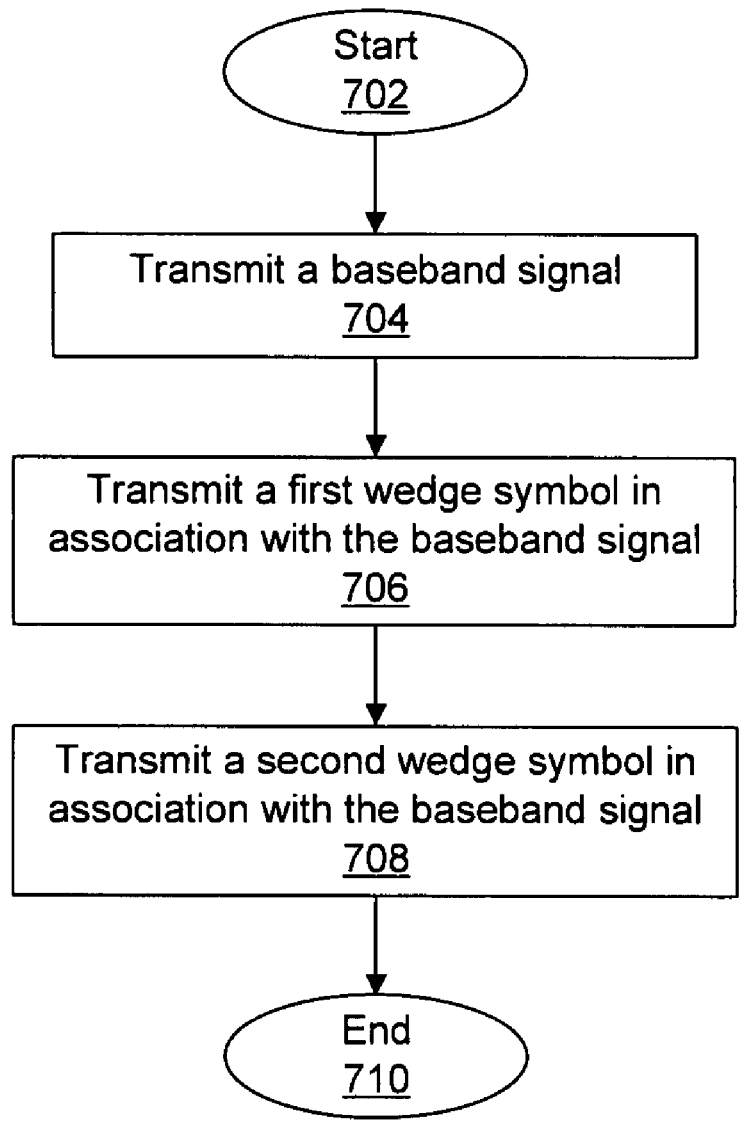
FIG. 7 illustrates a flow diagram for an example method of transmitting a radio-frequency (RF) signal with timing information.

Referring now to FIG. 7, a flow diagram for an example method of transmitting an RF signal with timing information is shown and indicated by the general reference character 700. The flow can begin (702), and a baseband signal can be transmitted (704). Next, a first wedge symbol can be transmitted in association with the baseband signal (706). For example, the first wedge symbol is transmitted at a time offset from a predetermined sample time by a fraction of a multiple of a chip rate. Then, a second wedge symbol can be transmitted in association with the baseband signal (708), and the flow can complete (710). For example, the second wedge symbol is transmitted subsequent to the transmission of the first wedge symbol, and the second wedge symbol may be transmitted at a time offset from a predetermined sample time by a fraction of the multiple of the chip rate.

Although the invention has been described with reference to specific embodiments thereof, these embodiments are merely illustrative, and not restrictive of the invention. For example, although the invention has been described primarily with respect to digital satellite phone transmissions, features of the invention can be adapted for use with other data transmission systems. Although specific timing units or intervals are discussed (e.g., chip, fraction of a chip) it should be apparent that features of the invention can be applied to various timing applications at any suitable resolutions.

Any suitable modulation scheme can also be used. Further, particular embodiments may be adaptable for use in time-division multiplexing (TDM), frequency-division multiplexing (FDM), orthogonal frequency-division multiplexing (OFDM), CDMA, or other types of multiplexing, etc. Other techniques for timing detection and recovery may be used in addition to those disclosed herein. For example, narrow band approaches that include a stream of pulses can be utilized where the timing of a symbol can be changed in order to identify a signal peak.

Particular embodiments can also utilize timing wedges as a keepalive or to provide redundant support. In such an approach, one transmitter can transmit, while others can monitor timing wedges from that transmitter. Generally, particular embodiments can provide for simplified receiver design by allowing pulse center detection without having to look on either side of a given received pulse. Other approaches in particular embodiments can support transmitter reference and/or active transmitter determinations. Further, particular embodiments can also accommodate single offset wedges, where a transmitter can perform mistiming such that a receiver may not need to look off a nominal point.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment," "an embodiment," "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," "in particular embodiments," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for determining a timing error of a signal received in a receiver from a transmitter, the method comprising:

receiving, from the transmitter, first and second symbols that are transmitted off-peak in association with the signal following timings of the transmitter, wherein the transmitter is one of a plurality of transmitters that are separate devices from the receiver and that are configured to transmit to the receiver;

detecting the first and second symbols by sampling the first and second symbols received from the transmitter, wherein the sampling is performed at a rate approximately equal to a chip rate that is synchronized between the transmitter and the receiver;

calculating a timing error result for the received signal by comparing magnitudes of the detected first and second symbols; and sending the timing error result from the receiver to the transmitter to allow the transmitter to modify subsequent transmissions from the transmitter.

2. The method of claim 1, wherein the detecting the first and second symbols comprises decimating the received signal to the chip rate.

3. The method of claim 1, further comprising calculating timing error results for each of the plurality of transmitters.

4. The method of claim 3, wherein the timing error results for each of the plurality of transmitters are used to synchronize a baseband timing of the plurality of transmitters.

5. The method of claim 1, wherein the first and second symbols are transmitted off-peak at a fraction of the chip rate.

6. The method of claim 1, further comprising using a difference of the magnitudes of amplitudes of the first and second symbols to derive the timing error result.

7. The method of claim 6, wherein the first and second symbols are off-peak by a predetermined amount so that a slope of the difference of the magnitudes is maximized at a time of the sampling at the chip rate.

8. The method of claim 1, wherein the receiver is one of a plurality of receivers receiving the signal and the first and second symbols from the transmitter.

9. The method of claim 1, wherein the timing error result is calculated without performing any oversampling in the receiver.

10. The method of claim 1, wherein the signal comprises a radio-frequency (RF) signal.

11. An apparatus configured to determine a timing error of a signal received in the apparatus from a transmitter, the apparatus comprising:
   a radio-frequency (RF) receiving circuit for receiving, from the transmitter, first and second symbols that are transmitted off-peak in association with the signal following timings of the transmitter, wherein the transmitter is one of a plurality of transmitters that are separate devices from the apparatus and that are configured to transmit to the apparatus, wherein the signal comprises an RF signal;
   a detector for detecting the first and second symbols by sampling the first and second symbols received from the transmitter, wherein the sampling is performed at a rate approximately equal to a chip rate that is synchronized between the transmitter and the apparatus;
   a comparator for comparing magnitudes of the detected first and second symbols to calculate a timing error result for the received signal; and
   a sender for sending the timing error result from the apparatus to the transmitter to allow the transmitter to modify subsequent transmissions from the transmitter.

12. The apparatus of claim 11, wherein the RF receiving circuit comprises a demodulator configured to produce a baseband signal from the received signal.

13. The apparatus of claim 12, wherein the RF receiving circuit comprises an analog-to-digital converter (ADC) configured to convert the baseband signal to a digital stream.

14. The apparatus of claim 11, further comprising a pulse shaping filter coupled to the detector.

15. The apparatus of claim 11, further comprising a wedge extractor configured to measure the magnitudes of the first and second symbols.

16. The apparatus of claim 11, wherein the apparatus is one of a plurality of receivers receiving the signal and the first and second symbols from the transmitter.

17. The apparatus of claim 11, wherein the timing error result is calculated without performing any oversampling in the apparatus.

18. The apparatus of claim 11, wherein the apparatus is a configured to calculate timing error results for each of the plurality of transmitters to synchronize a baseband timing of the plurality of transmitters.

19. The apparatus of claim 11, wherein the signal and the first and second symbols are transmitted through a satellite from the transmitter to the apparatus.

20. A system for determining a timing error of a signal received in a receiver from a transmitter, the system comprising:
   means for receiving, from the transmitter, first and second symbols that are transmitted off-peak in association with the signal following timings of the transmitter, wherein the transmitter is one of a plurality of transmitters that are separate devices from the receiver and that are configured to transmit to the receiver;
   means for detecting the first and second symbols by sampling the first and second symbols received from the transmitter, wherein the sampling is performed at a rate approximately equal to a chip rate that is synchronized between the transmitter and the receiver;
   means for calculating a timing error result for the received signal by comparing magnitudes of the detected first and second symbols; and
   means for sending the timing error result from the receiver to the transmitter to allow the transmitter to modify subsequent transmissions from the transmitter.

* * * * *